United States Patent
Korrek

(10) Patent No.: US 8,180,940 B2
(45) Date of Patent: May 15, 2012

(54) METHOD AND SYSTEM FOR TRANSMISSION OF CYCLIC AND ACYCLIC DATA OVER A TRANSMISSION CHANNEL THAT TAKES INTO ACCOUNT REAL-TIME CAPABILITY

(75) Inventor: Andre Korrek, Marienmuenster (DE)

(73) Assignee: Phoenix Contact GmbH & Co KG, Blomberg (DE)

( * ) Notice: Subject to any disclaimer, the term of this patent is extended or adjusted under 35 U.S.C. 154(b) by 554 days.

(21) Appl. No.: 12/091,248

(22) PCT Filed: Oct. 31, 2006

(86) PCT No.: PCT/EP2006/010477
§ 371 (c)(1),
(2), (4) Date: Sep. 8, 2009

(87) PCT Pub. No.: WO2007/051595
PCT Pub. Date: May 10, 2007

(65) Prior Publication Data
US 2010/0057959 A1    Mar. 4, 2010

(30) Foreign Application Priority Data
Nov. 4, 2005 (DE) .......................... 10 2005 053 103

(51) Int. Cl.
*G06F 13/00* (2006.01)
(52) U.S. Cl. ....................................... 710/110; 710/105
(58) Field of Classification Search .......... 710/104–105, 710/110–119, 58–61, 29–37; 714/39, 47, 714/18
See application file for complete search history.

(56) References Cited

U.S. PATENT DOCUMENTS

| | | | |
|---|---|---|---|
| 5,327,428 A * | 7/1994 | Van As et al. | 370/353 |
| 6,144,658 A | 11/2000 | Lebizay et al. | |
| 6,813,664 B2 * | 11/2004 | Koellner et al. | 710/117 |
| 7,158,532 B2 * | 1/2007 | Garney et al. | 370/447 |

(Continued)

FOREIGN PATENT DOCUMENTS

DE           44 08 488 A1    9/1995
(Continued)

OTHER PUBLICATIONS

"German Office Action for German International Application No. 10 2005 053 103.2-31", Oct. 5, 2006, Publisher: German Patent Office, Published in: DE.
Agnes Wittmann-Regis, "Patent Application PCT/EP2006/010477 International Preliminary Report on Patentability and Written Opionion", Jun. 11, 2008, Published in: EP.
"Chinese Office Action for International Application No. 200680041032.X", Apr. 22, 2010, Publisher: Chinese Patent Office, Published in: CN.

(Continued)

*Primary Examiner* — Raymond Phan
(74) *Attorney, Agent, or Firm* — DeMont & Breyer, LLC

(57) ABSTRACT

A method is disclosed for the transmission of cyclic and acyclic data by means of a transmission channel between at least two user devices connected to the transmission channel, with a protocol-specific cyclic data transmission being carried out at least between one user device functioning as a master and at least one user device functioning as a slave. During an impending transmission cycle, data to be transmitted is checked against corresponding data of a preceding cycle with regard to redundancy and currency. Upon detection of an impending transmission cycle for which redundant data without new information content is provided, acyclic data is inserted in lieu of said data in the data field provided for said data. The transmission channel effectively counteracts disadvantages previously resulting from a ring structure and a linear structure, and combines advantages of the one topology group with advantages of the other topology group.

22 Claims, 4 Drawing Sheets

U.S. PATENT DOCUMENTS

| | | | |
|---|---|---|---|
| 7,480,282 B2 * | 1/2009 | Clune et al. | 370/350 |
| 7,836,224 B2 * | 11/2010 | Oster et al. | 710/33 |
| 2002/0018002 A1 * | 2/2002 | Stippler | 340/825.69 |
| 2010/0146225 A1 * | 6/2010 | Biehler et al. | 711/154 |

FOREIGN PATENT DOCUMENTS

| | | |
|---|---|---|
| DE | 4408488 A1 | 9/1995 |
| DE | 102 06 904 A1 | 9/2003 |
| DE | 102 23 966 A1 | 12/2003 |
| DE | 10223966 A1 | 12/2003 |
| DE | 10 2004 014 793 A1 | 10/2005 |
| WO | 2004/030297 A1 | 4/2004 |

OTHER PUBLICATIONS

Cena G. T Al.: "Standard field bus networks for industrial applications", Computer Standards and Interfaces, Elsevier Sequoia. Lausanne, CH, vol. 17, No. 2, Jan. 15, 1995, pp. 155-167, XP000484515 ISSN: 0920-5489.

Decotignie J D et al.: "Producer-Distributor-Consumer Model on Controller area Network", Proceedings of the IFAC/IFIC Workshop, Real Time Programming, Oxford, GB, Nov. 6, 1995, pp. 35-42, XP0020744139.

International Search Report and Written Opinion.

* cited by examiner

| Address | Function code | Data | CRC |
|---|---|---|---|
| 1 Byte | 1 Byte | 1 ..64 Byte | 2 Byte |

| Error Exception | Error code |
|---|---|
| 1 Byte | 1 Byte |

Master

| Address | Function code | Data | | | | CRC |
|---|---|---|---|---|---|---|
| 255 | 57 h | PDC1 | PDC2 | ... | PDCn | xxxxh |

Master or slave

| Error Exception | Error code |
|---|---|
| D7 h | 0 |

METHOD AND SYSTEM FOR TRANSMISSION OF CYCLIC AND ACYCLIC DATA OVER A TRANSMISSION CHANNEL THAT TAKES INTO ACCOUNT REAL-TIME CAPABILITY

The invention relates to a method as well as a system for the transmission of cyclic and acyclic data over a transmission channel, taking into account real-time capability.

An industrial communications system, employed in data transmission systems, that connects a multitude of field devices such as measuring heads (sensors), final controlling elements and/or drives (actuators) to a control device is known as a field bus. A multitude of different field bus systems having different characteristics are established on the market, and are largely standardized worldwide.

Topologically, market-relevant field bus systems are currently subdivided, in essence, into two groups; on the one hand, into systems having a linear structure including strand structure or tree structure, such as Profibus, CAN or Ethernet, and on the other hand, into systems having a ring structure, such as Interbus.

Systems having a ring structure customarily are distinguished, in particular, by a high protocol efficiency, which is reflected in a high net data rate for a low transmission frequency. A ring topology implies a synchronous data transfer or data transmission of all users. Consequently, information to be transmitted is relayed from user to user until reaching the respective given user. Additional advantages are the excellent diagnostic characteristics with regard to the transmission link and the omission, to a large extent, of an allocation of device addresses and timings, since peer-to-peer connections are at issue for the transmission links, and consequently, unlike in a client/server or master/slave connection, a communication occurs among equals.

In contrast to this, the field bus systems for a topology based on a linear structure are, as a rule, hotplug-capable, i.e., it is possible to plug in and plug out individual users during running bus operation without much difficulty. In addition, process data and acyclic data, including device diagnosis data, can be transmitted, to nearly any extent, depending on the situation. These topologies are essentially based on a client/server or master/slave communication.

In general, however, it can be emphasized that the advantages connected with a ring structure correspond to the disadvantages of a linear structure and vice versa. In addition, particularly based on today's high complexity and high transmission speeds possessed by the presently established and accordingly market-relevant bus systems, a bus coupling frequently can be realized only by means of special and expensive protocol chips or µControllers.

One purpose of the invention is to identify a way of transmitting data by means of a transmission channel which effectively counteracts disadvantages previously resulting from a ring structure and linear structure and combines advantages of the one topology group with advantages of the other topology group, whereby to be ensured, in particular, are a hotplug capability and a situationally dependent transmission of process data and acyclic data, including diagnosis data, as well as a low protocol overhead and a synchronous data transfer and data transmission of process data to all connected users.

The solution according to the invention is given by means of a method according to claim 1 and also by means of a transmission system according to claim 20.

Advantages and/or preferred embodiments and improvements are the object of the respective subclaims.

According to the invention, it is therefore provided to improve a method for data transmission based on a protocol for cyclic data transmission by means of a transmission channel such that data to be transmitted in an impending cycle are checked against corresponding data of a preceding cycle for redundancy and currency, and in the event of recognition of an impending transmission cycle in which only redundant data without new information content is, in effect, to be transmitted, acyclic data is inserted, in lieu of the data without new information content, in the data field provided for said redundant data.

This preserves the equidistance of the sampling itself as well as the deterministic during the transmission of process data, which are particularly important criteria for control applications, without narrowing the user data throughput.

In order to carry out the method according to the invention, the invention proposes, in particular, a transmission system which in order to transmit and receive data is composed of a common data line between one master and at least one slave user. A multitude of linked slave users can, in this connection, form a user station to which the master is connected by means of the data line. The data transmission system is additionally composed of an application specific protocol, on the basis of which data is transmitted in cyclic time intervals between the master and slaves in order to write data in the slaves, and data is exchanged between the slaves and master in order to read out data from the slaves. The master possesses a dedicated test entity to enable checking data provided for an impending cyclic transmission with regard to its redundancy and currency in comparison to data, stored in a memory device, already transmitted during a preceding cyclic transmission, and also a deciding entity, coupled with the test entity, to enable deciding whether—and if yes, which—acyclic data is to be inserted in a data field in which for all intents and purposes only redundant data would be transmitted without new information content.

Advantageously, within each transmission cycle the master device reads out process input data from slave devices during a respective first data cycle, and during a respective subsequent second data cycle transmits process output data or the acyclic data.

In particular, it is provided that acyclic data can be inserted not only for transmission from the master device to slave devices, but also for transmission from slave devices to the master device.

In addition, a preferred improvement provides for cyclic data to be inserted not only for transmission from the master device to slave devices, but also for transmission between individual slave devices and/or from slave devices to the master device.

For this, it is provided that all user devices read information being transmitted at the same time during a data cycle.

For prompt error recognition, it is additionally provided that the user devices form a test sum or check sum by means of respective received or passively-monitored data, and compare this to a test sum or check sum appended to the received or passively-monitored data.

In a preferred improvement it consequently is provided for an error message to be transmitted back upon detection of an error.

In a practical manner, the invention provides for each data transmission during one data cycle to be commenced with the transmission of an address followed by a function code. A CRC generated by the master advantageously forms the closing.

The invention provides, in particular, for inquiry data, response data, or diagnosis data to be transmitted as acyclic data.

It moreover is advantageous if the master device predetermines a respective instant at which one or several slave users are to transmit acyclic data.

For this it is advantageous if, in order to predetermine such respective instants, the master device transmits, during a preceding data cycle within which acyclic data are transmitted, a corresponding function code at the same time.

In order to increase the error protection, in particular for security-critical processes, it is in addition provided that a normal data cycle comprising cyclic data be carried out at least after the transmission of a predetermined maximum number of consecutive data cycles comprising acyclic data.

Alternatively or additionally it is further provided in a preferred manner that if no error-free cyclic data exchange is activated within a predetermined period, an error is recognized and a pre-parameterized error process commenced.

For the transmission of data during each data cycle, the invention advantageously utilizes the constant external structure of a telegram assembled of an address, function code, a given number of user data and a test sum or check sum, with an Inter-Frame-Timeout, within which no data are transmitted, being advantageously provided between two consecutive telegrams.

The invention additionally proposes not performing a repetition of data transmitted in error during a data cycle until a subsequent corresponding data cycle.

In the event of recognition of the non-availability of a slave device during a data cycle of a contemplated data transmission, a particularly advantageous improvement of the invention further provides for the master device to embed a place holder in the corresponding time window assigned to the slave device.

During a data cycle, diagnosis data to be transmitted for evaluation are preferably commenced by means of a transmission request of the master device, whereby during such a diagnosis cycle information of higher priority is transmitted preferentially.

These and additional features as well as accompanying advantages of the invention are yielded from the following description of preferred exemplary embodiments, with reference being made to the enclosed drawings.

The method and transmission system according to the invention is based on a common data line for the transmitting and receiving of data, in particular, of process data. For example, operating on the basis of a LIN bus known from automotive technology is a generic transmission system of this type, for which during given data cycles protocol-specific data can be read out by a master from field devices linked to a field station, and during respective subsequent data cycles these data can be written into such [field devices linked to a field station], at approximately 19.2-38 kbd.

The invention embraces the fact that for many applications the deterministic, thus the predeterminedness, and unchangeability are more important in the transmission of process data than the actual transmission speed itself.

In the present invention said deterministic is determined by means of the bus cycle time of the transmission system, which is advantageously adjustable and for example lies in a range between 10 and 100 ms. Accordingly, a default setting of, e.g., 25 ms is sufficient for a transmission of 16 process data values at 16 bits per cycle.

In the method according to the invention, the transmission of process input data and process output data consequently also occurs, as a matter of principle, at a fixed interval, offset in each case by half the bus cycle time.

Figures 1, 2, 3:
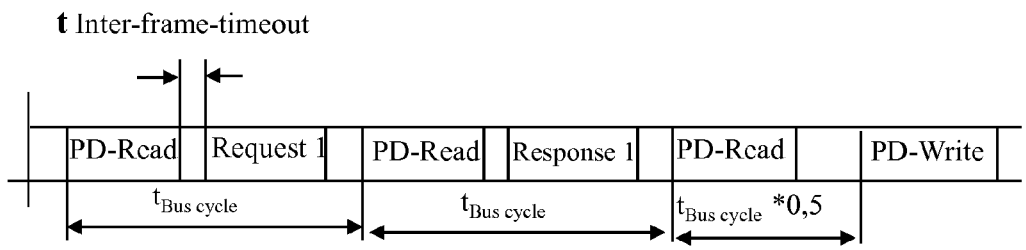
FIG. 1 shows possible bus accesses within bus cycles preferably used for the method according to the invention.
FIG. 2 shows an example of a frame configuration for a telegram used according to the invention
FIG. 3 shows a telegram configuration during a PD-Write access cycle.

With reference being made to FIG. 1, the following description starts first from the fact that the transmission protocol for the cyclic transmission of process input data and process output data makes use of two different services, designated in the following as PD-Read and PD-Write. Accordingly, one bus cycle is composed of one data cycle based on a PD-Read service and a subsequent data cycle based on a PD-Write service.

In the transmission of process output data, a master of the transmission system according to the invention thus transmits to a station in the PD-Write service connected to said master, in principle, all data for the field devices linked to the station, and advantageously subsequently identifies a CRC (cyclic redundancy check) that it also transmits. The transmission system is advantageously designed such that all linked field devices read all information transmitted in this way at the same time, and preferably likewise form a CRC that they compare to the received CRC of the master, such that in the event of an error an error message is generated and, for example, the entire station or individual field devices are operated in a secure status.

In the transmission of process input data, the master transmits, with a PD-Read service, e.g., first a broadcast address followed by a function code. The field devices connected to the station thereupon place their data, thus in particular their process input data, bit for bit on the data line in byte spaces provided for this. In a preferred embodiment the linked field devices are in turn enabled, by monitoring the data line at the same time, to detect all data and to likewise calculate a CRC for this purpose.

In addition, the invention capitalizes on the fact that the process output data, as a rule, does not always have to be transmitted, i.e., particularly if the process output data at hand for transmission has undergone no change whatsoever and the field devices linked to a field station are already in possession of the up-to-date process output data. The master includes for this purpose a test entity to enable ascertaining whether any difference exists in the data to be transmitted from one cycle to the next. If the test entity determines in this connection that no difference exists and if in the preceding cycle no error message has occurred, a deciding entity of the master decides whether acyclic data such as an inquiry, response or diagnosis data is to be transmitted in the impending time slot in lieu of the actual redundant data transmission.

In the example illustrated in FIG. 1, the master consequently transmits, according to the invention, an inquiry indicated as "Request 1" within one bus cycle after the closing of a PD-Read service in the time slot actually provided for a PD-Write service. The instant at which the "slave" is hereupon to send a given response, designated as "Response 1" in FIG. 1, is advantageously determined by the master by means of one bit of a function code. Accordingly, in accordance with FIG. 1, a delay of the response until after the next PD-Read service is preset, thus until the time slot actually provided for the next PD-Write service, such that the deterministic continues to be secured, and in addition the slave has more time for processing the inquiry.

Particularly for security-critical processes, use of the method according to the invention additionally provides that the interruption of a PD-Write cycle cannot exceed a maximum number of consecutive data cycles, and otherwise a pre-parametered error processing, e.g., the operation of the field devices in secure status, will be commenced. The interruption of a PD-Write cycle therefore may occur, e.g. a maximum of 15 consecutive data cycles, and in the 16$^{th}$ time slot a PD-Write access must again occur. Alternatively or additionally it can be preset, in order to improve security, such that within a predetermined period, e.g., of 1000 ms, at least one valid, thus error-free, cyclic data exchange must have occurred, and otherwise all linked field devices recognize an error and commence the pre-parametered error processing.

A preferred, yet fundamentally protocol-dependent frame configuration for the method according to the invention during a PD-Write cycle, PD-Read cycle or acyclic data cycle is illustrated in FIG. 2. The respective telegram length comprises 68 characters in this connection, and advantageously is laid out such that there is no excessive memory requirement for the field devices linked as slaves.

Accordingly, the telegram comprises an address of one byte, which identifies a given user, or in the case of a Broadcast-Address, all users, as the receiver. Following afterwards is a function code, comprising in the present case likewise one byte, which defines the intended function of the subsequent user data. The actual user data comprise, in the present example, 64 bytes followed by a CRC comprising 2 bytes. Between the individual characters of such a telegram a maximum pause cannot be exceeded during transmission, since otherwise an error would be detected. This pause is predetermined, e.g., at 1 ms and also is identified as an Inter-Character-Timeout. Between two consecutive telegrams is provided, in addition, an Inter-Frame-Timeout (Inter-Frame-Timeout) (FIG. 1), e.g. of 2 ms, in order for the possibly required error processing to be executed correctly by the receiver.

A transmitting-back of an Error-Exception-Code and of an Error-Code as illustrated in FIG. 2, thus the notification that an error has been detected and what error has been detected by means of the receiver, preferably occurs only upon detection of such an error and expeditiously begins between one and two milliseconds after the CRC of the sender obtained by the receiver.

The aforementioned preferred, yet merely exemplary frame configuration and the time response therefore is compatible with other protocols, e.g., with the Modbus protocol.

Unlike such a Modbus protocol, however, the function code for application of the invention is advantageously limited to the lower seven bits of the function code byte. For an acyclic service the master signals to the slave or slaves, by means of setting the highest-value bit, that it is not anticipating the response to an inquiry until after the next PD-Read access, as illustrated in FIG. 1. However, since this highest value bit is inserted only between the protocol stacks of the transmitter and receiver in the data stream, the commands in Layer 7 of the OSI layer model likewise are Modbus-compatible.

The transmission of data words (16 bit) occurs, e.g., in the Big-Endian format, i.e., the high byte is transmitted first.

As already disclosed, the invention is based on a data exchange of a fundamentally cyclic construction which takes place in a firmly defined grid and advantageously is partitioned in the aforementioned PD-Read and PD-Write access or cycle, as the case may be, so that with the PD-Write access data is transmitted from the master to the slaves, and transmission occurs in the other direction, thus essentially from the slaves to the master, with the PD-Read access. For the following description, reference moreover should be made to the fact that a respective process datum consists of 16 bits and is referred to as a process data channel (PDC).

The PD-Write access consequently comes into use in particular if the master is to transmit cyclic information to a station comprising a multitude of field devices. Accordingly all users linked to the station, thus the field devices, in this case process the data (PDCs) intended for them at the same time, thereby also executing the desired actions nearly synchronously.

Such a PD-Write access is illustrated by example in FIG. 3. If a user, even the master itself, if applicable, locates an error after or during the transmission, it generates the error response, e.g., what is represented in FIG. 3, subsequent to the transmission based on the PD-Write service. Since upon detection of an error said error response is transmitted back, and as referenced above, the linked users read all data at the same time according to a preferred embodiment, the invention provides for all users, in response to a error response read together, to discard the last-transmitted data such that the data from the last valid, thus error-free, cycle continues to possess validity. A repetition of the telegram by the master, rather than occurring immediately, occurs in the next time slot reserved for a PD-Write service.

The number of PDCs to be transmitted is defined, in principle, by means of the master configuration. If it is set to zero, no PD-Write accesses are performed.

Unlike the PD-Write service and corresponding access to the data line, the PD-Read access is not optional. In principle it serves to transmit data from the field devices of the station to the superimposed control system or master.

Figure 4:
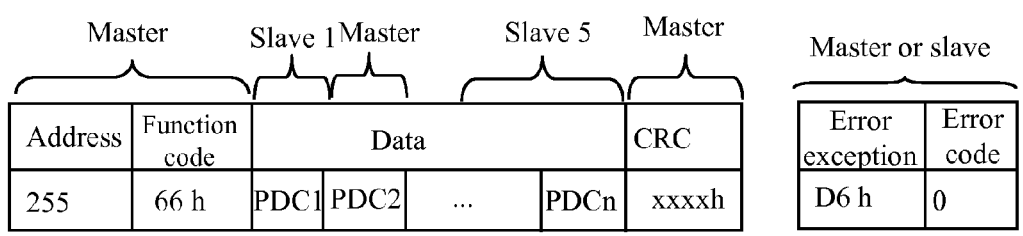
FIG. 4 shows a telegram configuration during a PD-Read access cycle.

According to the invention, however, it is provided, with reference to the PD-Read service and corresponding access to the data line, for data to be distributable also within the station, and thus in essence, between the individual field devices. An exemplary protocol frame configuration during a PD-Read access is illustrated in FIG. 4. There exists for each of the PDCs illustrated in FIG. 4 a so-called "producer" which outputs the data word (16 bit) to the bus at the correct instant. According to the invention, not only the slaves but also the master of the system according to the invention are permitted to be data-producing devices. A device can not only release data of a superimposed system, but also its own data, e.g., digital input data.

Each PD-Read access is commenced by the master with the transmission of the corresponding address and function code. At the conclusion of this, the producer of the first PDC has, e.g., a time of 500 µs to start its data transmission. Should the transmission not yet have begun, for example, after 750 µs, the master recognizes that the producer is not ready for operation, or is not available. In this case the master generates a placeholder for the corresponding PDC by embedding a corresponding profile-dependent error code. The subsequent producers notice no difference through said error processing, and begin their transmission in the time window provided for them. If all PDCs are read in, the master generates a check sum CRC. All users likewise compute a check sum and compare it to that generated by the master. If they detect a difference the error response illustrated, e.g., in FIG. 4 is generated, and according to the preferred embodiment, wherein all users read all data at the same time, all users discard the data of said last cycle. For generation of the check sum it is further advantageous for the producers to not carry this out with the data that they read back from the bus, but with the data that they transmit to the bus, since only this ensures a complete monitoring.

An obvious application for such a PD-Read access is, e.g., the visualization of data on a display. Additional practical applications include, among others, the output of an active power value of a field device, comprising, e.g., an Electronic Load Relay-Motor Management (ELR-MM, Electronic Load Relay-Motor Management) on an analog output terminal, or the expansion of an ELR-MM by means of additional digital inputs and outputs.

The configuration of the individual PDCs is preferably carried out according to the following proposal. As already addressed, a PDC is advantageously composed of a 16-bit data word, which for representation is done in two's complement form. Consequently, generic consumers can, by means of a defined description, interpret the data, wherein the inquiry of the description also can take place by means of a service. Content of such a description are, alongside a profile, also the scaling boundaries of the process data value and a symbolic name, which may comprise 16 characters.

Consequently a PDC is configured, e.g., according to $$PDC = \begin{cases} 8080, & \text{if measured value} < \text{scaling low } (SL) \\ 8001, & \text{if measured value} > \text{scaling high } (SH) \\ \dfrac{(Messwert - SL) * 65024}{SH - Sl}, & \text{otherwise} \end{cases}$$

Key: 1 Measured value
with representation of the process data for integration of the transmission system according to the invention resulting on a bus in a corresponding compatible form, and scaling of the PDC occurring by means of the preceding equation. The profile further specifies which value the master transmits if a user is not available.

Presented in the following table is a listing of exemplary profiles, a respective description, and also the respective associated base unit and error word.

| Profile-ID | Description | Base-Unit | Error word |
|---|---|---|---|
| 0 | Invalid profile | — | 0000 h |
| 1 | Bit information, no scaling | — | 0000 h |
| 2 | ELR-status<br>Bit 15 . . . 8: status of digital inputs<br>Bit 7: MSG: message:<br>Collective message<br>Bit 6: IND: error:<br>Collective error message<br>Bit 5 . . . 3: reserved<br>Bit 2: return message<br>Clockwise rotation<br>Bit 1: return message: stop<br>Bit 0: return message:<br>Counterclockwise rotation | — | 0000 h |
| 2 . . . F | Reserved | — | 0000 h |
| 10 h | Current, scaling in the defined boundaries | A | 8040 h |
| 11 h | Voltage, scaling in the defined boundaries | V | 8040 h |
| 12 h | Resistance, scaling in the defined boundaries | Ω | 8040 h |
| 13 h | Frequency, scaling in the defined boundaries | Hz | 8040 h |
| 14 h | Temperature, scaling in the defined boundaries | °C. | 8040 h |
| 15 h | Temperature, scaling in the defined boundaries | °F. | 8040 h |
| 16 h | Temperature, scaling in the defined boundaries | °K | 8040 h |
| 17 h | Active power, scaling in the defined boundaries | W | 8040 h |
| 18 h | Apparent power, scaling in the defined boundaries | VA | 8040 h |
| 19 h | Reactive power, scaling in the defined boundaries | var | 8040 h |
| 1A h | Energy, scaling in the defined boundaries | kWh | 8040 h |
| 1B h | Operating cycles, scaling in the defined boundaries |  | 8040 h |
| 1C . . . 2F h | Reserved | — | 8040 h |

In addition to the error code 8040 h, which is generated by the master, yet further error codes are advantageously defined, which as a rule, however, relate to the status of the PDC and not to the status of the entire field device. Application-contingent diagnosis information is consequently distributed in the station by means of the acyclic service "diagnosis access," with the following table presenting, as examples, several error codes and corresponding error descriptions.

| PDC | Error |
|---|---|
| 8001 h | Department from the measurement range, representation range (Overrange) |
| 8002 h | Wire breakage, network error |
| 8004 h | No valid measurement value available (invalid measurement value) |
| 8010 h | Additional error information present |
| 8020 h | PDC not activated |
| 8040 h | Module defect or not ready for operation |
| 8080 h | Department from the measurement range, representation range (Underrange) |

The following example will clarify the scaling and mapping of the PDC code

| +/−20 mA<br>SL: −0.0261674<br>SH: 0.021674<br>[mA] | +/−10 V<br>SL: −10.837<br>SH: 10.837<br>[V] | +/−3000 W<br>SL: −32512<br>SH: 32512<br>[W] | PDC-Datum<br>[hex] |
|---|---|---|---|
| >+21.6746 | >+10.837 | >+32512 | 8001 Overrange |
| +21.6746 | +10.837 | +32512 | 7F00 (32512) |
| +20.0000 | +10.000 | +30.000 | 7530 (30000) |
| +0.666667μ | +333.33μ | +1 | 0001 (1) |
| 0 | 0 | 0 | 00000 |
| −6.666667μ | −333.33μ | −1 | FFFF (−1) |
| −20 | −10 | −30000 | 8AD0 (−30000) |
| −21.6746 | −10.837 | −32512 | 8100 (−32512) |
| <−21.6746 | <−10.837 | <−32512 | 8080 Underrange |

For the transmission system according to the invention, or according to the method according to the invention, as the case may be, evaluation of diagnosis data is preferably done by polling, i.e., by transmission polling. Any time a free time-slot is available, the master dedicated to the transmission system automatically carries out diagnosis cycles. Users which are defined as producers are monitored by means of the diagnosis access. All others are polled in rotation.

After a reset, all PDCs having a profile equal to or greater than a profile number of, e.g., 10 h transmit the error code 8020 h, both in the diagnosis data as well as in the process data. Not until the configuration data of the user has been checked and confirmed by the master will its PDCs be activated.

Figure 5:
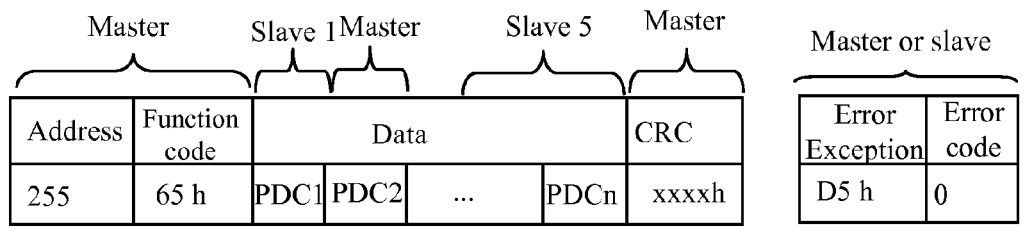
FIG. 5 shows a telegram configuration during an acyclic embedded diagnosis access.

According to the invention, the basic mode of operation of the diagnosis access embeddable in the cyclic transmission protocol grid is comparable to the aforementioned PD-Read access. A substantial difference consists, however, in the fact that status information is transmitted in lieu of the process data. A telegram frame during a diagnosis access is illustrated in FIG. 5 as an example.

If a user possesses several PDCs, it can announce different events simultaneously. If only one channel is available for diagnosis, only the highest-priority information is ever transmitted, for security reasons.

Diagnosis information is composed, e.g., of two bytes. The status class and the status code. The status code is to be evaluated as a bit field, i.e., multiple fields also are permissible or possible. The higher the code of the class, the higher also the priority of the event. For example, all classes below 80 h are to be classified as messages and not as errors. Some examples of diagnosis information are listed in the following.

| Class | Code | Description |
|---|---|---|
| | | Errors: Module |
| FF h | 01 h | Input module of device defective |
| | 02 h | Supply voltage not OK |
| | 04 h | EEPROM: manufacturer range nonstandard |
| | 80 h | Reserved |
| | 10 h | EEPROM: configuration invalid |
| | 20 h | Output module of device defective |
| | 40 h | Module defect or not ready for operation |
| | 80 h | Reserved |
| | | Errors: ELR-MM input, output |
| 98 h | 01 h | L1 defective |
| | 02 h | L2 defective |
| | 04 h | L3 defective |
| | 08 h | Network defective |
| | 10 h | T1 interrupted (no power flow) |
| | 20 h | T2 interrupted (no power flow) |
| | 40 h | T3 interrupted (no power flow) |
| | 80 h | "Open load" |
| | | Errors: ELR-MM |
| 97 h | 01 h | Upper message threshold left |
| | 02 h | Lower message threshold left |
| | 04 h | Upper message threshold right |
| | 08 h | Lower message threshold right |
| | 10 h | Thermistor-overtemperature |
| | 20 h | Counterclockwise and clockwise |
| | 40 h | Operations counter exceeded |
| | 80 h | Current monitoring |
| | | Errors: MCR (measurement, control, regulation) |
| 97 h | 01 h | Cold junction |
| | 02 h | Reserved |
| | 04 h | Reserved |
| | 08 h | Reserved |
| | 10 h | Reserved |
| | 20 h | Reserved |
| | 40 h | Reserved |
| | 80 h | Reserved |

-continued

| Class | Code | Description |
|---|---|---|
| | | PDCs Channel |
| 80 h | 01 h | Department from the measurement range, representation range (Overrange) |
| | 02 h | Wire breakage, network error |
| | 04 h | No valid measurement value available (Measurement value invalid) |
| | 08 h | Reserved |
| | 10 h | Additional error information available |
| | 20 h | PDC not activated |
| | 40 h | Module defect or not ready for operation |
| | 80 h | Department from the measurement range, representation range (Underrange) |
| | | Messages: ELR-MM |
| 0F h | 01 h | Upper message threshold left |
| | 02 h | Lower message threshold left |
| | 04 h | Upper message threshold right |
| | 08 h | Lower message threshold right |
| | 10 h | Thermistor-overtemperature |
| | 20 h | Thermistor-short circuit |
| | 40 h | Operations counter exceeded |
| | 80 h | Current monitoring |
| | | Messages: ELR-MM |
| 0E h | 01 h | Capacity-limit switch left |
| | 02 h | Capacity-limit switch left |
| | 04 h | Limit switch left |
| | 08 h | Limit switch left |
| | 10 h | Reserved |
| | 20 h | Reserved |
| | 40 h | Reserved |
| | 80 h | HVO-operation activated |

Figure 6:
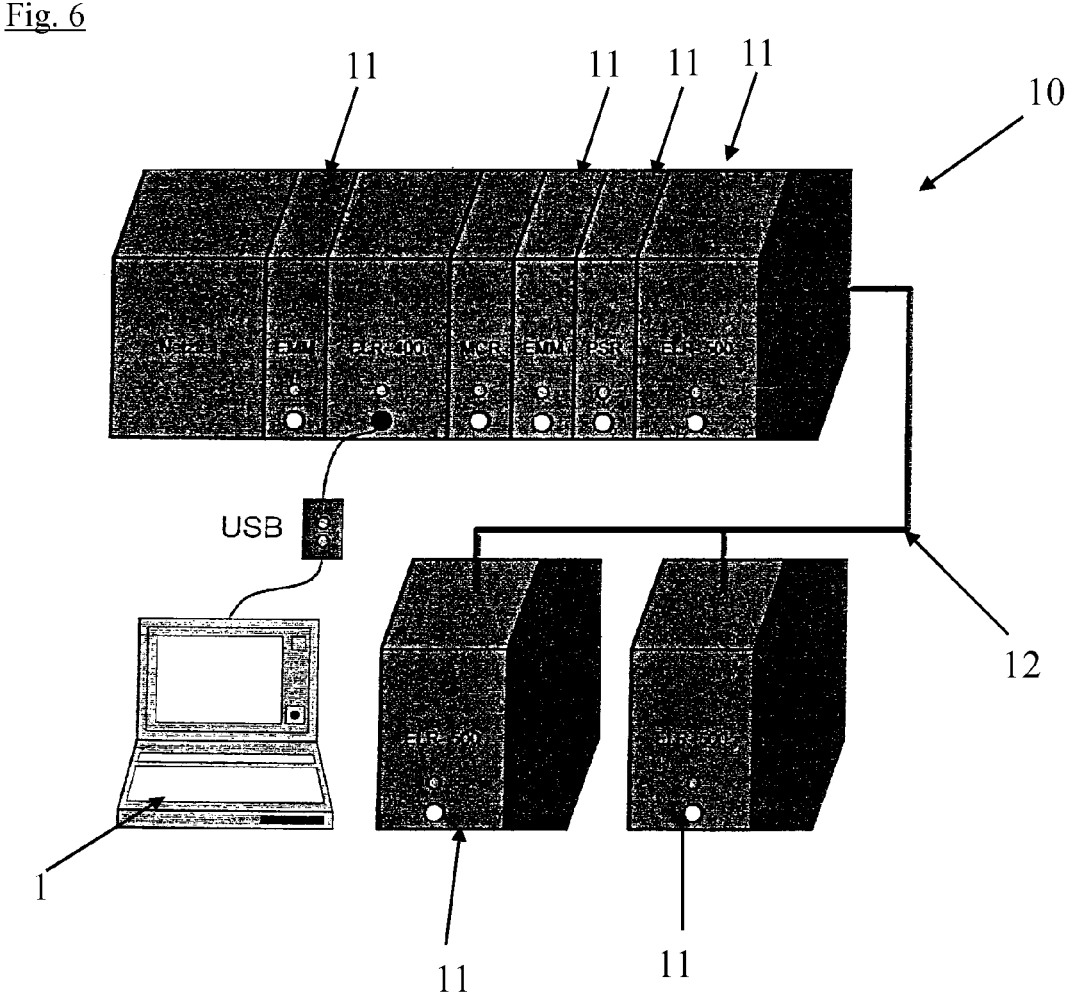
FIG. 6 shows a possible topology of the transmission system according to the invention.

FIG. 6 shows a possible configuration topology for the transmission system according to the invention. A master device (1), in the present case a notebook computer, is connected according to FIG. 6 by means of a USB interface to a field station (10) comprising a multitude of field devices (11). The physical connection of the field devices (11) or slaves, as the case may be, in the field station (10) can be effected both by means of an integrated bus, e.g., by means of a backplane bus, as well as by means of a separate cable (12).

Figure 7:
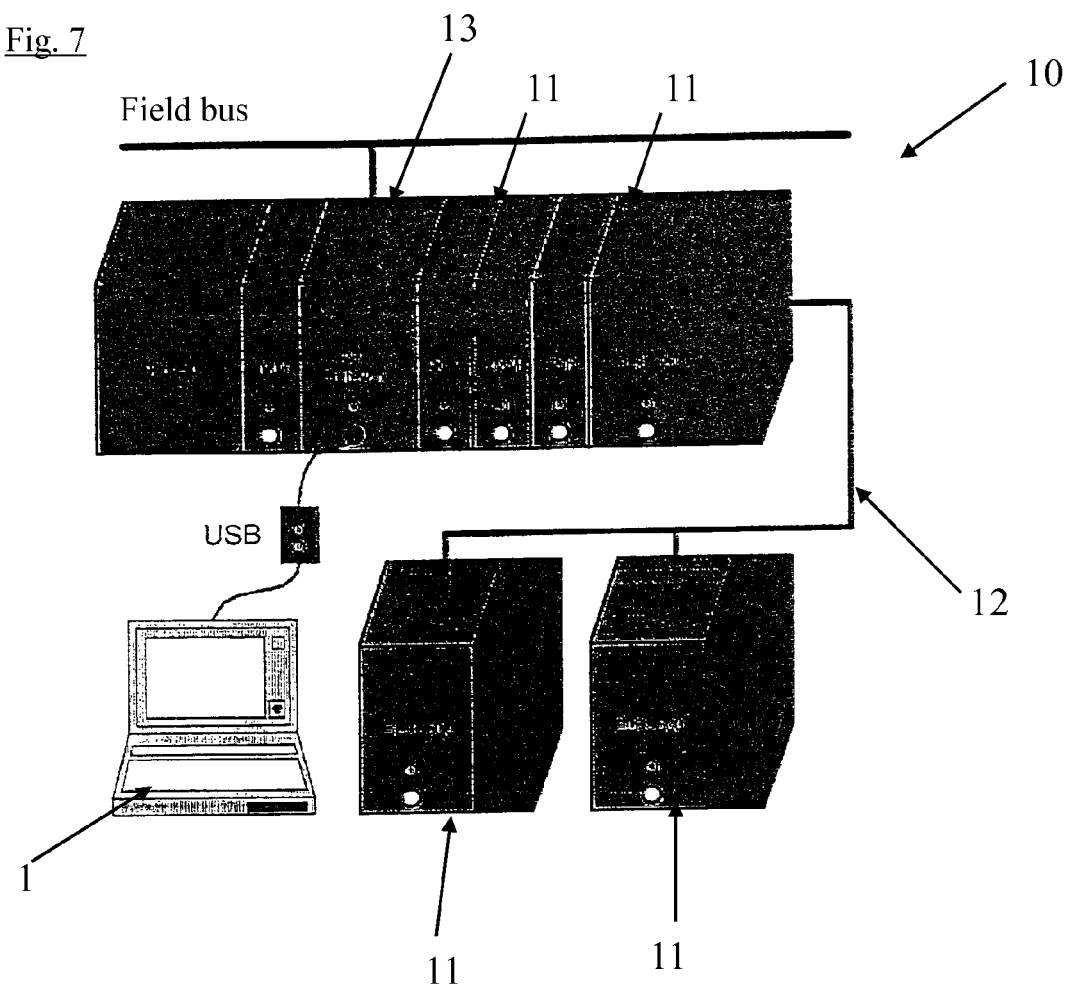
FIG. 7 shows an integration of the transmission system according to the invention in an existing bus topology.

Apart from the topology illustrated in FIG. 6, the transmission system according to the invention also can be used, e.g., to integrate the field station in a field bus environment as outlined in FIG. 7. Here the transmission system according to the invention is coupled, e.g., by means of a gateway (13) to a field bus, e.g., a Profibus, with other field bus systems such as Interbus, CAN, Device Net, Ethernet or even wireless solutions also being coupleable to the transmission system according to the invention. Mapping of the PDCs of the transmission system according to the invention is done on a 1:1 basis into those of the target system, thus, of the field bus system, with the transmission of acyclic data, e.g., parameters, characteristic curves and measurement data being precisely as dependent on the target system as the integration of the operating software.

Based on a Profibus system, for example, acyclic data are transmitted by DPV1 services. The configuration of the individual field devices can be effected both by means of the Profibus per DTM (Device Type Management), thus a control system having a Class 2 master, as well as also locally at the represented field station by means of the notebook computer employed as the master (1) of the transmission system. The local configuration should, in this connection, always be the back door if the target system does not allow any manufacturer-independent parameterization, or, if the development cost for this is too high, such as for Interbus, CAN, Device Net.

Plugging the local master (1) of the transmission system according to the invention into the gateway (13) of the field station (11) communicates to the gateway (13) that a master of a higher priority for establishing the transmission system according to the invention is taking over control of the field station (10). The gateway (13) thereupon terminates all outstanding acyclic commands, and subsequently notifies a control (Class 1 master), superimposed on the field bus system or Class 2 masters, of the unavailability of the entire station. These thereupon have, e.g., one second of time to conduct the station into a secure status. After this time has elapsed, the bus coupler integrated in the station becomes inactive and the master (1) of the transmission system according to the invention takes over local control of the station, preferably after a bus timeout of, e.g., 500 ms. By means of the fact that the master (1) of the transmission system according to the invention continues initiating a cyclic data exchange from time to time in order to read from process input data, wherein the time should be selected to be less than the bus reset time of, e.g., 2 seconds, the individual field devices pause in a secure status. The gateway (13) likewise reads said data at the same time and refreshes its field bus side process output data.

If the gateway (13) detects that the connection to the master (1) of the transmission system according to the invention has been separated, it automatically starts the cyclic data exchange in order to read the process data. If a complete cycle has terminated, the field-bus-side process data are again refreshed, and the availability of the station for superimposed control is signaled.

The invention consequently combines Hot Plug capability and situationally dependent transmission of cyclic process data, acyclic data, including diagnosis data, with the advantages of a low protocol overhead, and the synchronous transfer and transmission of process data to all users. The protocol efficiency leads to a reduction of the gross data rate in the transmitting medium, so that protocol processing no longer has to be performed by means of a special protocol chip, but rather can be realized by means of a microcontroller already present in the user. The hardware expense for the bus coupling consequently originates only from the bus physics, thus the line driver in particular. An additional secondary effect of the low clock rate according to the invention is a high level of fault-free operation and low emitted interference, and also the relinquishment of an additional external timing. Indeed the allocation of an address for each device continues to be necessary; however, an error-prone setting of the DIP or Coding switch can be eliminated by means of special mechanisms, which are not the object of the invention.

In summary, the invention consequently enables data exchange with several users within a communications component, based on the aforementioned description, in particular within a PD-Read access. This establishes the high efficiency of the protocol and synchronization during data transfer/transmission. The preferred reading of said data at the same time by all users leads to a further increase in efficiency, since this causes the PDCs to only have to be transmitted one time to the bus, and in addition the arbitration overhead for a multi-master system is omitted.

Moreover the invention enables the discarding of redundant information, particularly in PD-Write access, and the filling of the corresponding time slot with acyclic data including diagnosis data, without loss of real-time capability in the transmission of PDCs due to delay of the required response, if applicable, for acyclic data exchange.

The invention claimed is:

1. A method for the transmission of cyclic and acyclic data by means of a transmission channel between at least two user devices connected to the transmission channel, with a protocol-specific cyclic data transmission being carried out at least between one user device functioning as a master and at least one user device functioning as a slave, the method comprising:
    checking, during an impending transmission cycle, data to be transmitted against corresponding data of a preceding cycle for redundancy and currency; and
    upon detection of an impending transmission cycle for which redundant data without new information content is provided, inserting acyclic data in lieu of said data in the data field provided for said data;
    wherein an error is recognized if no error-free cyclic data exchange is activated within a predetermined time period and a pre-parameterized error process is commenced.

2. The method according to claim 1, wherein, within each transmission cycle, process input data is read out by the master device from slave devices during a respective first data cycle, and during a respective second data cycle following thereupon, process output data or the acyclic data is transmitted.

3. The method according to claim 1, wherein acyclic data are inserted for transmission from the master device to at least one slave device and/or from at least one slave device to the master device.

4. The method according to claim 1, wherein cyclic data is inserted for transmission between individual slave devices, from slave devices to the master device and/or from the master device to slave devices.

5. The method according to claim 1, wherein all user devices read information being transmitted at the same time during a data cycle.

6. The method according to claim 1, wherein the user devices form a cyclic redundancy check (CRC) by means of respective received data or data read at the same time and compare it to a CRC appended to the data received or read at the same time.

7. The method according to claim 1, wherein each data cycle is introduced with the transmission of an address followed by a function code.

8. The method according to claim 1, wherein inquiry data, response data or diagnosis data is transmitted as acyclic data.

9. The method according to claim 1, wherein the master device predetermines a respective given instant at which one or more slave users are to transmit acyclic data.

10. The method according to claim 1, wherein a normal data cycle comprising cyclic data is carried out at least after transmission of a predetermined maximum number of consecutive data cycles comprising acyclic data.

11. The method according to claim 1, wherein, during each data cycle a telegram is transmitted comprising an address, function code, user data and a cyclic redundancy check (CRC).

12. The method according to claim 1, wherein a repetition of data transmitted incorrectly during a data cycle is not carried out until a subsequent corresponding data cycle.

13. The method according to claim 1, wherein, upon detection of the unavailability of a slave device during a data cycle for the provided data transmission, the master device embeds a place holder in the corresponding time window assigned to the slave device.

14. The method according to claim 1, wherein, during a data cycle, diagnosis data to be transmitted for evaluation is triggered by means of a transmission request of the master device.

15. The method according to claim 6, wherein, upon detection of an error, an error message is transmitted back.

16. The method according to claim 9, wherein, at the start of the respective given instant during a preceding data cycle within which acyclic data is transmitted by the master device, a corresponding function code is transmitted at the same time.

17. The method according to claim 11, wherein an Inter-Frame-Timeout within which no data is transmitted is provided between two consecutive telegrams.

18. The method according to claim 14, wherein, during a diagnosis cycle, higher-priority information is transmitted in a preferential manner.

19. A method for the transmission of cyclic and acyclic data by means of a transmission channel between at least two user devices connected to the transmission channel, with a protocol-specific cyclic data transmission being carried out at least between one user device functioning as a master and at least one user device functioning as a slave, the method comprising:
- checking, during an impending transmission cycle, data to be transmitted against corresponding data of a preceding cycle for redundancy and currency; and
- upon detection of an impending transmission cycle for which redundant data without new information content is provided, inserting acyclic data in lieu of said data in the data field provided for said data;
- wherein during each data cycle a telegram is transmitted comprising an address, function code, user data and a cyclic redundancy check (CRC).

20. A method for the transmission of cyclic and acyclic data by means of a transmission channel between at least two user devices connected to the transmission channel, with a protocol-specific cyclic data transmission being carried out at least between one user device functioning as a master and at least one user device functioning as a slave, the method comprising:
- checking, during an impending transmission cycle, data to be transmitted against corresponding data of a preceding cycle for redundancy and currency; and
- upon detection of an impending transmission cycle for which redundant data without new information content is provided, inserting acyclic data in lieu of said data in the data field provided for said data;
- wherein a repetition of data transmitted incorrectly during a data cycle is not carried out until a subsequent corresponding data cycle.

21. A method for the transmission of cyclic and acyclic data by means of a transmission channel between at least two user devices connected to the transmission channel, with a protocol-specific cyclic data transmission being carried out at least between one user device functioning as a master and at least one user device functioning as a slave, the method comprising:
- checking, during an impending transmission cycle, data to be transmitted against corresponding data of a preceding cycle for redundancy and currency; and
- upon detection of an impending transmission cycle for which redundant data without new information content is provided, inserting acyclic data in lieu of said data in the data field provided for said data;
- wherein upon detection of the unavailability of a slave device during a data cycle for the provided data transmission, the master device embeds a place holder in the corresponding time window assigned to the slave device.

22. A method for the transmission of cyclic and acyclic data by means of a transmission channel between at least two user devices connected to the transmission channel, with a protocol-specific cyclic data transmission being carried out at least between one user device functioning as a master and at least one user device functioning as a slave, the method comprising:
- checking, during an impending transmission cycle, data to be transmitted against corresponding data of a preceding cycle for redundancy and currency; and
- upon detection of an impending transmission cycle for which redundant data without new information content is provided, inserting acyclic data in lieu of said data in the data field provided for said data;
- wherein during a data cycle, diagnosis data to be transmitted for evaluation is triggered by means of a transmission request of the master device.

* * * * *